United States Patent
Yamamoto

(10) Patent No.: US 11,827,082 B2
(45) Date of Patent: Nov. 28, 2023

(54) VEHICLE DOOR

(71) Applicant: KAWASAKI MOTORS, LTD., Hyogo (JP)

(72) Inventor: Teruaki Yamamoto, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 0 days.

(21) Appl. No.: 17/732,303

(22) Filed: Apr. 28, 2022

(65) Prior Publication Data

US 2023/0347721 A1   Nov. 2, 2023

(51) Int. Cl.
*B60J 1/17* (2006.01)
*B60J 5/04* (2006.01)

(52) U.S. Cl.
CPC .............. *B60J 1/17* (2013.01); *B60J 5/0416* (2013.01)

(58) Field of Classification Search
CPC .......... B60J 5/0416; B60J 1/17; B60J 5/0487; B60R 13/0243; B60R 16/005
See application file for complete search history.

(56) References Cited

U.S. PATENT DOCUMENTS

| 2,324,600 | A * | 7/1943 | Joseph | B60R 16/005 200/61.31 |
| 7,410,202 | B2 * | 8/2008 | Rose | B60R 16/005 296/146.16 |
| 8,979,171 | B2 * | 3/2015 | Usami | B60N 2/797 296/153 |
| 10,400,497 | B2 * | 9/2019 | Ikeda | B60J 1/00 |
| 10,400,498 | B2 * | 9/2019 | Ikeda | B60J 1/17 |
| 11,549,289 | B2 * | 1/2023 | Miwa | E05B 85/12 |
| 2006/0185970 | A1 * | 8/2006 | Stack | B60N 2/0228 200/61.62 |
| 2007/0182215 | A1 * | 8/2007 | Rose | B60R 16/005 296/211 |
| 2009/0066107 | A1 | 3/2009 | Sakamoto | |
| 2018/0058127 | A1 * | 3/2018 | Ikeda | B60J 1/17 |

FOREIGN PATENT DOCUMENTS

JP           2007524145 A  *  8/2007  ............. H01H 13/70

* cited by examiner

*Primary Examiner* — Jason S Morrow
(74) *Attorney, Agent, or Firm* — Studebaker & Brackett PC

(57) ABSTRACT

A vehicle door includes an inner panel, a power window that opens or closes a window opening formed at an upper portion of the inner panel, and an operation switch provided at the inner panel to open or close the power window. The operation switch is arranged at the periphery of the window opening at the inner panel.

4 Claims, 3 Drawing Sheets

VEHICLE DOOR

FIELD

The technique disclosed herein relates to a vehicle door.

BACKGROUND

A door having a power window is provided with an operation switch for opening or closing the power window. For example, at a vehicle door disclosed in U.S. Patent Application Publication No. 2009/0066107, an operation switch is arranged at, e.g., an arm rest provided at a lower inner panel of the door.

SUMMARY

In the above-described vehicle, the operation switch for the power window sometimes interferes with the hands, elbows, legs, etc. of an occupant. For this reason, in some cases, the hand or the elbow unintentionally contacts the operation switch, and erroneously operates the power window.

The technique disclosed herein has been made in view of the above-described points, and an object thereof is to reduce interference of the operation switch for the power window with the occupant.

A vehicle door disclosed herein includes an inner panel, a power window, and an operation switch. The power window opens or closes a window opening formed at an upper portion of the inner panel. The operation switch is provided at the inner panel to open or close the power window. The operation switch is arranged at the periphery of the window opening at the inner panel.

DESCRIPTION OF EMBODIMENTS

Hereinafter, an exemplary embodiment will be described in detail based on the drawings.

Figure 1:
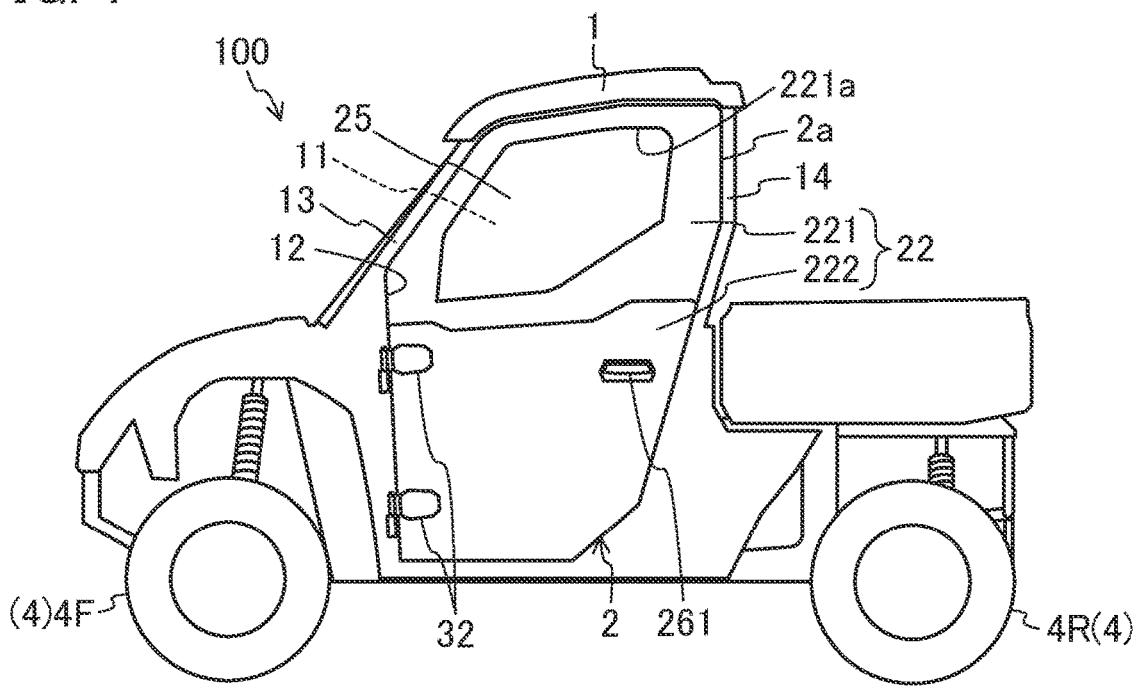
FIG. 1 is a left side view showing an outline configuration of a utility vehicle.

FIG. 1 is a left side view showing an outline configuration of a utility vehicle 100. The utility vehicle 100 is an automobile that can travel off road. The utility vehicle 100 is one example of a vehicle. The utility vehicle 100 includes a vehicle body 1, doors 2, and wheels 4.

Hereinafter, a front-rear direction will be set such that front and rear sides of the utility vehicle 100 in a traveling direction thereof is "front" and "rear," a right-left direction will be set such that right and left sides when facing the front side of the utility vehicle 100 in the traveling direction thereof are "right" and "left," and a height direction of the utility vehicle 100 will be set as an up-down direction. Moreover, the right-left direction is the same as a vehicle width direction which is a width direction of the utility vehicle 100, and for the sake of convenience in description, a vehicle compartment side in the vehicle width direction will be sometimes referred to as an "inner side in the vehicle width direction" and a vehicle outer side in the vehicle width direction will be sometimes referred to as an "outer side in the vehicle width direction."

In the vehicle body 1, a vehicle compartment 11 in which a driver seat and a passenger seat are provided is defined and formed. A door opening 12 causing the vehicle compartment 11 and the outside of the vehicle to communicate with each other is formed at a side portion of the vehicle body 1, i.e., a side portion of the utility vehicle 100. Although not shown in the figure in this example, the door openings 12 are formed at both right and left side portions of the vehicle body 1.

The vehicle body 1 has front pillars 13 and rear pillars 14. The front pillar 13 and the rear pillar 14 form part of an edge portion of the door opening 12. That is, the front pillar 13 defines and forms the front side of the door opening 12, and the rear pillar 14 defines and forms the rear side of the door opening 12.

The plurality of wheels 4 is provided, and supports the vehicle body 1. In this example, four wheels 4 are provided. That is, the wheels 4 include two front wheels 4F and two rear wheels 4R.

Figure 2:
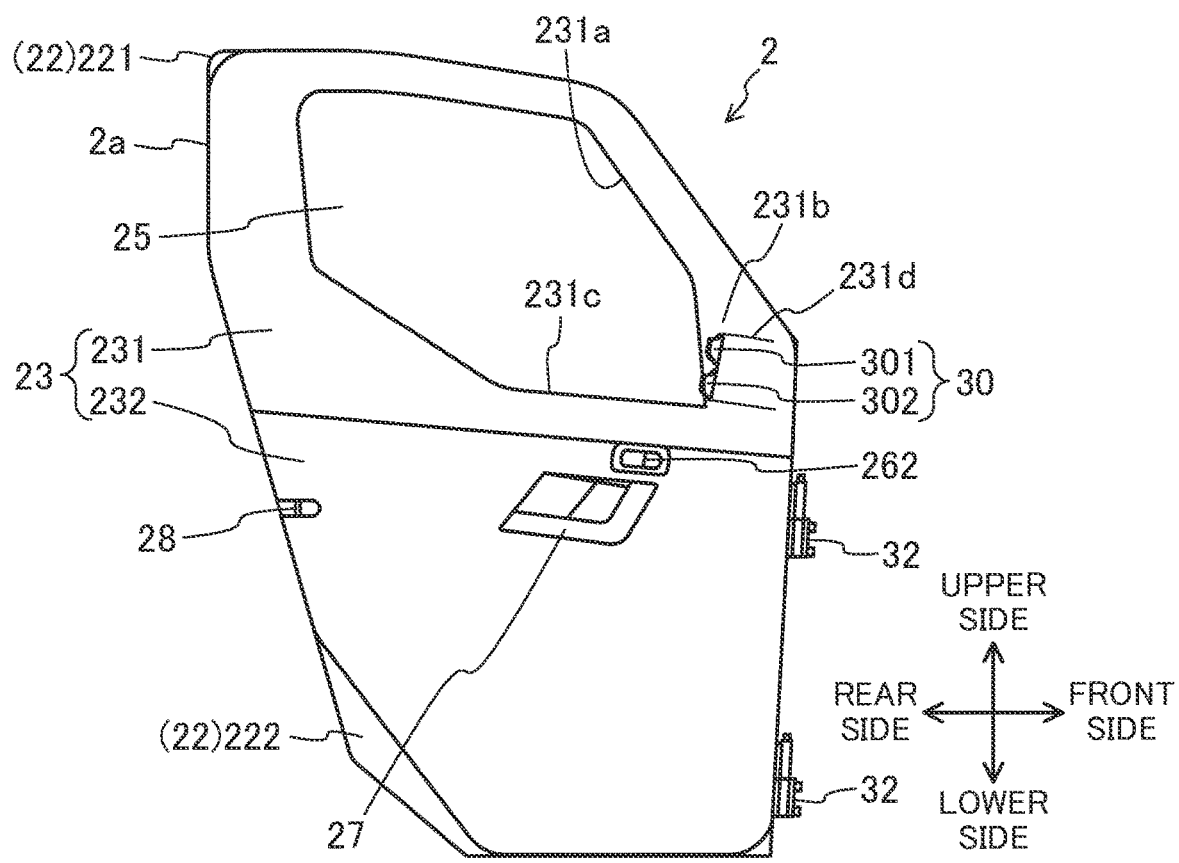
FIG. 2 is a side view showing a left door from an inner side in a vehicle width direction.

FIG. 2 is a side view showing the left door 2 from the inner side in the vehicle width direction. The door 2 is for opening or closing the door opening 12. In this example, two doors 2 for the door opening 12 at the left side portion and the door opening 12 at the right side portion are provided. The door 2 includes a door body 2a, a power window 25, and hinges 32. Note that the door 2 is also called a side door.

The door body 2a is supported by the hinges 32. The door body 2a turns in the front-rear direction about shafts of the hinges 32, thereby opening or closing the door opening 12. That is, the hinges 32 turnably support the door body 2a. In this example, two hinges 32 are provided. Two hinges 32 are provided at a front edge portion of the door opening 12, and are spaced from each other in the up-down direction at the vehicle body 1.

The door body 2a has an outer panel 22 and an inner panel 23. The door body 2a is formed such that the outer panel 22 and the inner panel 23 are stacked on each other. A window opening 231a is formed at an upper portion of the inner panel 23. Note that a corresponding window opening 221a having the same shape as that of the window opening 231a of the inner panel 23 is also formed at an upper portion of the outer panel 22. Since the outer panel 22 and the inner panel 23 are stacked on each other, it looks like the single window opening 231a being formed.

Each of the outer panel 22 and the inner panel 23 is divided into two portions in the up-down direction. Specifically, the outer panel 22 is divided into an upper outer panel 221 and a lower outer panel 222. The upper outer panel 221 is formed with the above-described window opening 221a, and the lower outer panel 222 is arranged below the upper outer panel 221. The inner panel 23 is divided into an upper inner panel 231 and a lower inner panel 232. The upper inner panel 231 is formed with the above-described window opening 231a, and the lower inner panel 232 is arranged below the upper inner panel 231.

The power window 25 is provided at the door body 2a, and opens or closes the window opening 231a. The power window 25 is provided between the outer panel 22 and the inner panel 23 so as to freely move up and down. The power window 25 moves up and down, thereby opening or closing the window opening 231a.

The door 2 further includes an outer knob 261, an inner knob 262, a door handle 27, a latch 28, and an operation switch 30.

The outer knob 261 is for rotation operation when an occupant outside the vehicle compartment 11 unlocks the door 2. As shown in FIG. 1, the outer knob 261 is provided at the outer panel 22, specifically the lower outer panel 222. More specifically, the outer knob 261 is arranged slightly on the upper side at a rear end portion of the lower outer panel 222.

The inner knob 262 is for rotation operation when the occupant in the vehicle compartment 11 unlocks the door 2. As shown in FIG. 2, the inner knob 262 is provided at the inner panel 23, specifically the lower inner panel 232. More specifically, the inner knob 262 is arranged slightly on the front side at an upper end portion of the lower inner panel 232. That is, the inner knob 262 is provided at a position below the window opening 231a at the inner panel 23. The inner knob 262 is one example of a door knob.

The door handle 27 is gripped by the occupant when the occupant opens or closes the door 2. The door handle 27 is provided at the inner panel 23, specifically the lower inner panel 232. More specifically, the door handle 27 is arranged slightly on the upper side at the center of the lower inner panel 232 in the front-rear direction. More specifically, the door handle 27 is arranged at a position below the inner knob 262.

The latch 28 is provided at the inner panel 23, specifically the lower inner panel 232. More specifically, the latch 28 is arranged slightly on the upper side at a rear end portion of the lower inner panel 232. Together with a not-shown striker provided at the vehicle body 1, the latch 28 unlocks or locks the door 2.

The operation switch 30 is provided at the inner panel 23 to open or close the power window 25. That is, the occupant operates the operation switch 30, thereby opening or closing the window opening 231a by the power window 25. Note that although not shown in the figure, a window regulator is provided between the lower outer panel 222 and the lower inner panel 232. The occupant operates the operation switch 30, thereby driving the window regulator to move the power window 25 up and down.

Figure 3:
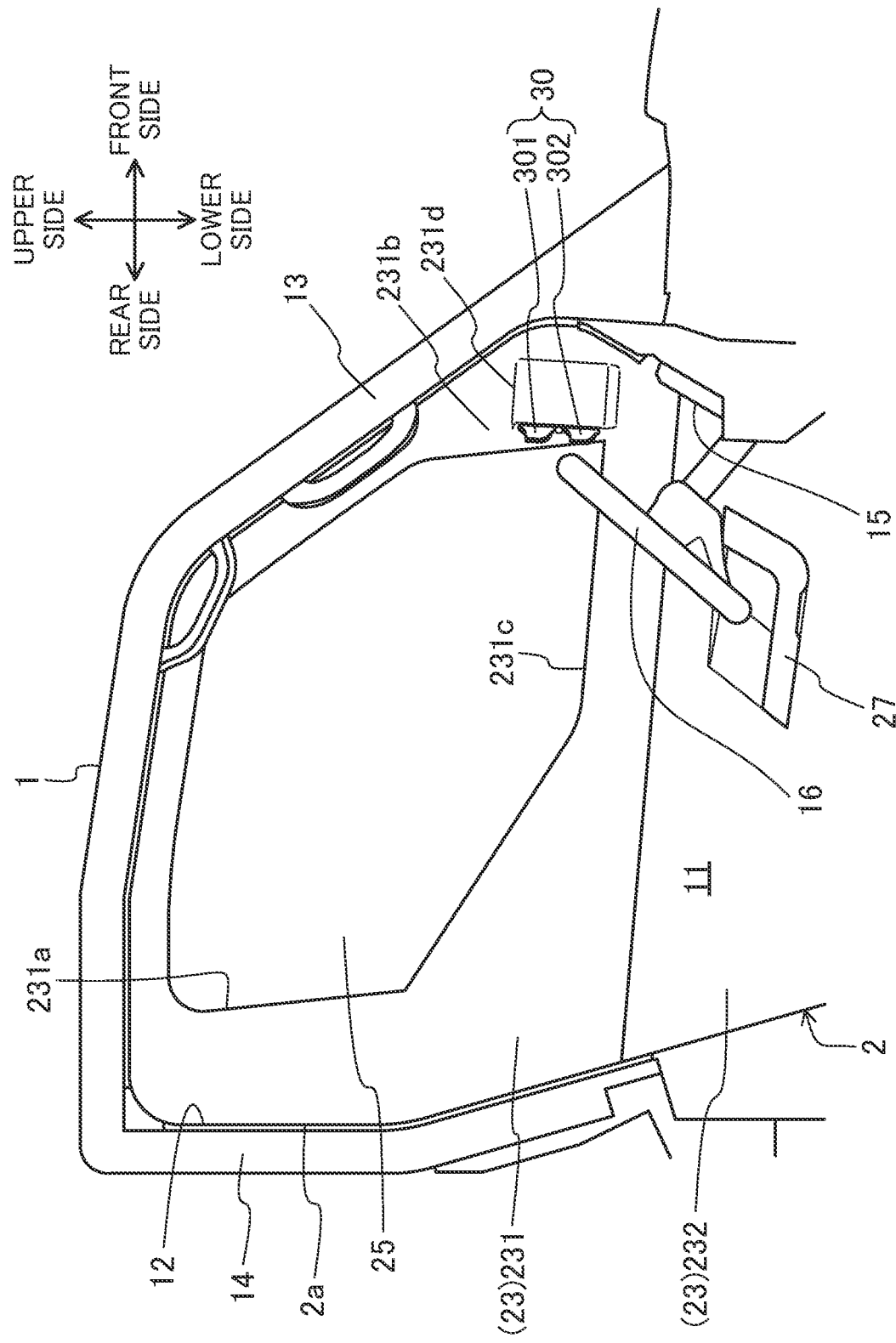
FIG. 3 is a side view showing the left door in a fully-closed state from the inner side in the vehicle width direction.
Figure 4:
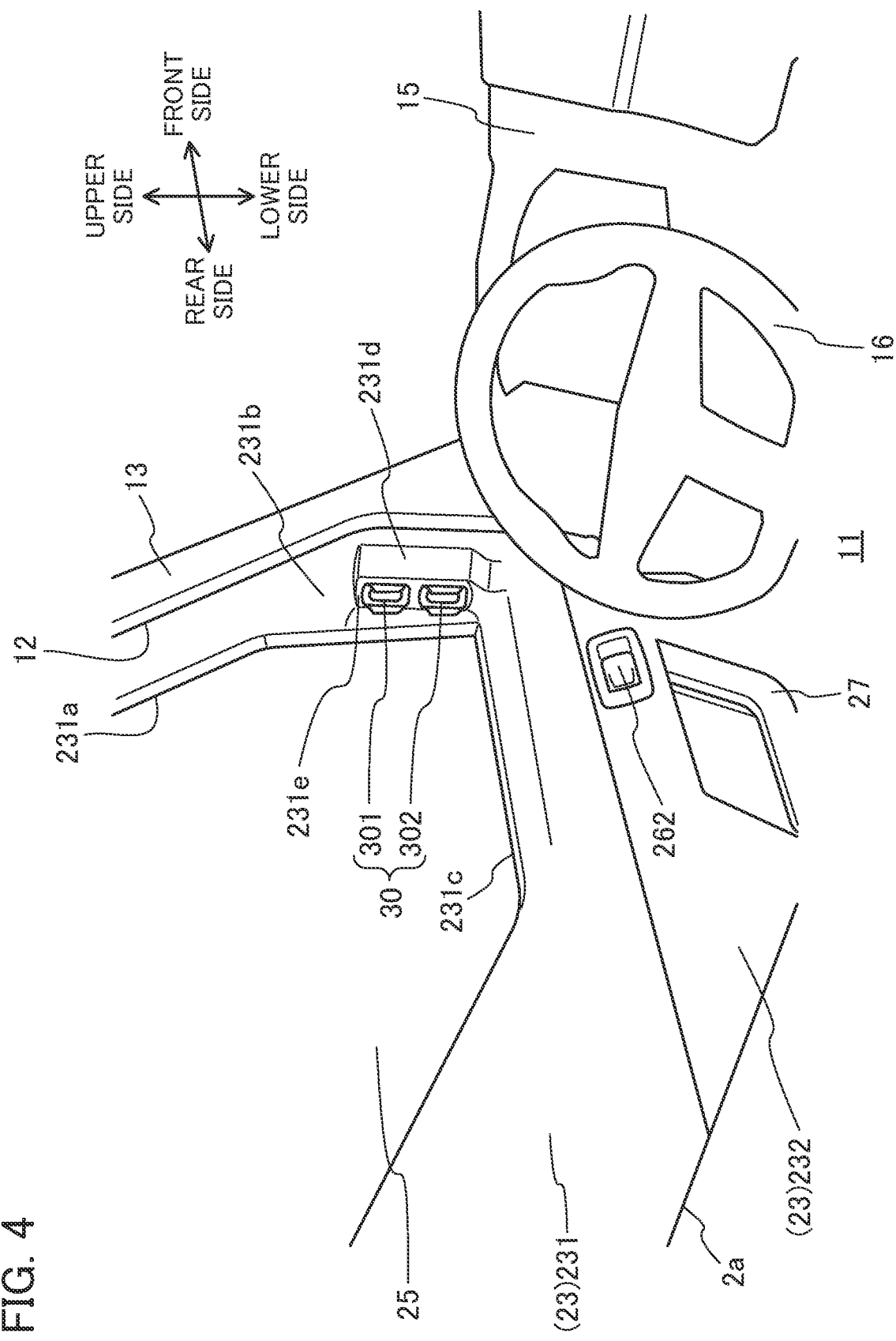
FIG. 4 is a perspective view showing the inside of a vehicle compartment diagonally from a rear right side when the door is in the fully-closed state.

FIG. 3 is a side view showing the left door 2 in a fully-closed state from the inner side in the vehicle width direction. FIG. 4 is a perspective view showing the inside of the vehicle body 1 diagonally from the rear right side when the door 2 is in the fully-closed state.

Although not shown in the figure in this case, the driver seat is arranged on the left side at a front portion in the vehicle compartment 11, and the passenger seat is arranged on the right side at the front portion in the vehicle compartment 11. That is, the utility vehicle 100 of this example is a so-called left-hand drive car. In the vehicle compartment 11, an instrument panel 15 is arranged at the front of the driver seat and the passenger seat, and a steering wheel 16 is arranged between the instrument panel 15 and the driver seat. Note that in this example, the door 2 on the driver seat side will be described.

In this example, the operation switch 30 has two switches including a first switch 301 and a second switch 302. For example, the first switch 301 is for operating the power window 25 of the driver seat side door 2, and the second switch 302 is for operating the power window of the passenger seat side door.

The operation switch 30 is arranged at the periphery of the window opening 231a at the inner panel 23. That is, the operation switch 30 is not provided at a lower portion of the inner panel 23, but at the upper portion of the inner panel 23. Specifically, the operation switch 30 is arranged at the upper inner panel 231 of the inner panel 23. Thus, the operation switch 30 is arranged at a position higher than a movement area of the hands, elbows, legs, etc. of a driver upon normal driving. This reduces interference of the operation switch 30 with the occupant's hands, elbows, etc. This further reduces unintended pressing of the operation switch 30 by the occupant due to contact of the occupant's hands, elbows, etc. with the operation switch 30.

More specifically, the operation switch 30 is arranged above the inner knob 262. In this configuration, since the operation switch 30 is arranged at a position higher than the inner knob 262, interference of the operation switch 30 with the occupant's hands etc. is reduced when the occupant operates the inner knob 262 to unlock the door 2.

Moreover, the operation switch 30 is arranged at a front edge portion 231b of the window opening 231a at the inner panel 23. Generally, the front edge portion 231b of the window opening 231a is positioned forward of the head of the driver, and therefore, the operation switch 30 is arranged at the front of the head of the driver. Thus, the driver easily views the operation switch 30 without looking away from the front upon driving. Consequently, the operability of the operation switch 30 by the driver is improved.

Further, the operation switch 30 is arranged on the front side of the steering wheel 16 in the front-rear direction at the front edge portion 231b of the window opening 231a. Upon driving, the driver constantly grips the steering wheel 16 with the hands. Thus, as compared to a case where the operation switch is, for example, positioned at the rear of the steering wheel 16, the driver easily operates the operation switch 30 with the hands without looking away from the front. Thus, the operability of the operation switch 30 by the driver is further improved.

More specifically, the operation switch 30 is provided at a projecting portion 231d of the front edge portion 231b of the window opening 231a. The projecting portion 231d is a portion formed such that part of the front edge portion 231b projects inwardly in the vehicle width direction. At the projecting portion 231d, an attachment surface 231e to which the operation switch 30 is to be attached is formed. The attachment surface 231e is substantially orthogonal to the front-rear direction.

More specifically, the attachment surface 231e is slightly inclined such that an upper portion thereof is positioned on the front side with respect to a lower portion. The operation switch 30 is attached to the attachment surface 231e so as to extend rearward. More specifically, the attachment surface 231e is a vertically-elongated surface, and the first switch 301 and the second switch 302 positioned next to each other in the vertical direction are attached to the attachment surface 231e.

At the front edge portion 231b of the window opening 231a, the operation switch 30 may be arranged at the substantially same height as that of the eye line of the driver. Specifically, in this example, the operation switch 30 is arranged at a position above a lower side 231c of the window opening 231a at the front edge portion 231b. Generally, the position of the lower side 231c of the window opening 231a is lower than that of the eye line of the driver. Thus, the operation switch 30 is arranged at the position above the lower side, and accordingly, the operation switch 30 is positioned at the substantially same height as that of the eye line of the driver. Consequently, the operation switch 30 can be more easily viewed.

As described above, the door 2 includes the inner panel 23, the power window 25, and the operation switch 30. The power window 25 opens or closes the window opening 231a formed at the upper portion of the inner panel 23. The operation switch 30 is provided at the inner panel 23 to open or close the power window 25. The operation switch 30 is arranged at the periphery of the window opening 231a at the inner panel 23.

With this configuration, the operation switch 30 is provided not at the lower portion but at the upper portion of the inner panel 23. Thus, the operation switch 30 is arranged at the position higher than the movement area of the hands, elbows, legs, etc. of the driver upon normal driving. That is, the operation switch 30 is not arranged within a necessary movement area of the hands, legs, etc. of the driver upon normal driving. This can reduce interference of the operation switch 30 with the hands, elbows, etc. of the occupant.

The door 2 further includes the inner knob 262 provided at the position below the window opening 231a at the inner panel 23. The operation switch 30 is arranged above the inner knob 262.

According to this configuration, since the operation switch 30 is arranged at the position higher than the inner knob 262, interference of the operation switch 30 with the hands etc. of the occupant when the occupant operates the inner knob 262 to unlock the door 2 can be reduced.

At the door 2, the operation switch 30 is arranged at the front edge portion 231b of the window opening 231a.

According to this configuration, since the front edge portion 231b of the window opening 231a is generally positioned at the front of the head of the driver, the operation switch 30 is arranged at the front of the head of the driver. Thus, the driver easily views the operation switch 30 without looking away from the front even upon driving. Thus, the operability of the operation switch 30 by the driver can be improved.

At the door 2, the operation switch 30 is arranged on the front side with respect to the steering wheel 16 in the front-rear direction.

Upon driving, the driver constantly grips the steering wheel 16 with the hands. Thus, as compared to the case where the operation switch is, for example, positioned at the rear of the steering wheel 16, the driver easily operates the operation switch 30 with the hands without looking away from the front. Thus, the operability of the operation switch 30 by the driver is further improved.

At the door 2, the inner panel 23 is divided into the upper inner panel 231 formed with the window opening 231a and the lower inner panel 232 arranged below the upper inner panel 231. The operation switch 30 is arranged at the upper inner panel 231.

According to this configuration, an attachment surface or hole for attaching the operation switch 30 is not necessary for the lower inner panel 232. Thus, the lower inner panel 232 of the door 2 in the form of a so-called full door can also be used as an inner panel of a door in the form of a so-called half door having no power window. In other words, the common lower inner panel can be used for the full door and the half door. Thus, a cost for a mold for molding the lower inner panel can be reduced.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described in the above-described embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the operation switch 30 may be arranged at a location other than the front edge portion 231b at the periphery of the window opening 231a. For example, the operation switch 30 may be arranged at a lower edge portion of the window opening 231a, i.e., below the lower side 231c of the window opening 231a.

The operation switch 30 may be arranged at the side of the steering wheel 16 or on the rear side with respect to the steering wheel 16 in the front-rear direction.

At the lower inner panel 232, the inner knob 262 and the door handle 27 may be arranged next to each other in the horizontal direction, or the inner knob 262 may be arranged at a position below the door handle 27.

At the operation switch 30, the first switch 301 and the second switch 302 may be arranged next to each other in the horizontal direction.

The operation switch 30 may have only the switch for the power window 25 of the seat provided with such an operation switch 30.

The inner panel 23 is not necessarily divided, and may be formed of a single member.

In the above-described embodiment, the door 2 on the driver seat side has been described, but the technique disclosed herein is also applicable to the door on the passenger seat side, needless to say.

The technique disclosed herein is also applicable to a configuration in which the hinges 32 are provided on the rear side of the door body 2a.

The technique disclosed herein may be applied to a vehicle other than the utility vehicle 100.

What is claimed:
1. A vehicle door comprising:
   an inner panel;
   a power window that opens or closes a window opening formed at an upper portion of the inner panel; and
   an operation switch provided at the inner panel to open or close the power window,
   wherein
   a front edge portion of the window opening at the inner panel includes a projecting portion which is a portion formed such that part of the front edge portion projects inwardly in a vehicle width direction,
   the projecting portion includes an attachment surface,
   the operation switch is arranged at the attachment surface, and
   the attachment surface is inclined such that an upper portion thereof is positioned on a front side with respect to a lower portion.
2. The vehicle door of claim 1, further comprising:
   a door knob provided at a position below the window opening at the inner panel,
   wherein the operation switch is arranged above the door knob.

3. The vehicle door of claim 1, wherein
the operation switch is arranged on a front side with respect to a steering wheel of the vehicle in a vehicle front-rear direction.

4. The vehicle door of claim 1, wherein
the inner panel is divided into an upper inner panel formed with the window opening and a lower inner panel arranged below the upper inner panel, and
the operation switch is arranged at the upper inner panel.

\* \* \* \* \*